(12) United States Patent
Nigam et al.

(10) Patent No.: US 9,973,945 B2
(45) Date of Patent: May 15, 2018

(54) METHOD AND APPARATUS FOR REPORTING MASTER INFORMATION BLOCK DECODING STATUS OF NEIGHBOR CELL IN WIRELESS COMMUNICATION SYSTEM

(71) Applicant: Samsung Electronics Co., Ltd., Suwon-si, Gyeonggi-do (KR)

(72) Inventors: Anshuman Nigam, Bangalore (IN); Jung-Soo Jung, Seongnam-si (KR); Sun-Heui Ryoo, Yongin-si (KR); Jung-Min Moon, Suwon-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/467,319

(22) Filed: Mar. 23, 2017

(65) Prior Publication Data
US 2017/0195902 A1 Jul. 6, 2017

Related U.S. Application Data

(63) Continuation of application No. 14/661,387, filed on Mar. 18, 2015, now Pat. No. 9,706,417.

(30) Foreign Application Priority Data

Mar. 18, 2014 (IN) .............................. 339/KOL/2014
Apr. 25, 2014 (IN) .............................. 429/KOL/2014

(51) Int. Cl.
*H04W 24/00* (2009.01)
*H04W 24/02* (2009.01)
*H04W 48/16* (2009.01)
*H04B 7/024* (2017.01)

(52) U.S. Cl.
CPC ............ *H04W 24/02* (2013.01); *H04B 7/024* (2013.01); *H04W 48/16* (2013.01)

(58) Field of Classification Search
CPC ............. H04W 48/12; H04W 36/0011; H04W 36/0061; H04W 36/32; H04W 16/10; H04W 16/24; H04W 16/32; H04W 8/08; H04W 8/14; H04W 72/04; H04W 72/12
See application file for complete search history.

(56) References Cited

U.S. PATENT DOCUMENTS

| | | |
|---|---|---|
| 2009/0176490 A1 | 7/2009 | Kazmi et al. |
| 2009/0239539 A1 | 9/2009 | Zhang et al. |
| 2011/0300866 A1 | 12/2011 | Ali et al. |
| 2012/0015657 A1 | 1/2012 | Comsa et al. |
| 2012/0213157 A1* | 8/2012 | Jeong .................... H04W 48/12 370/328 |
| 2013/0079048 A1 | 3/2013 | Cai et al. |

(Continued)

*Primary Examiner* — Mohamed Kamara
(74) *Attorney, Agent, or Firm* — Jefferson IP Law, LLP

(57) ABSTRACT

A method and an apparatus for efficiently reporting a master information block (MIB) decoding status of a neighbor cell in a wireless communication system are provided. The method includes receiving, by a user equipment (UE) and from an evolved Node B (eNB) of a serving cell, neighbor cell-related information for receiving an MIB of the neighbor cell, based on the neighbor-cell related information, decoding, by the UE, the MIB of the neighbor cell, and transmitting, by the UE, decoding information of the MIB to the eNB of the serving cell.

20 Claims, 12 Drawing Sheets

(56) References Cited

U.S. PATENT DOCUMENTS

| | | |
|---|---|---|
| 2014/0112180 A1 | 4/2014 | Axmon et al. |
| 2014/0206341 A1 | 7/2014 | Siomina et al. |
| 2014/0219259 A1 | 8/2014 | Lin et al. |
| 2014/0226623 A1* | 8/2014 | Seo .................. H04W 36/0055 370/331 |
| 2015/0018010 A1* | 1/2015 | Fischer ................ H04W 4/023 455/456.2 |
| 2015/0215825 A1* | 7/2015 | Kim .................. H04W 36/0088 370/331 |

* cited by examiner

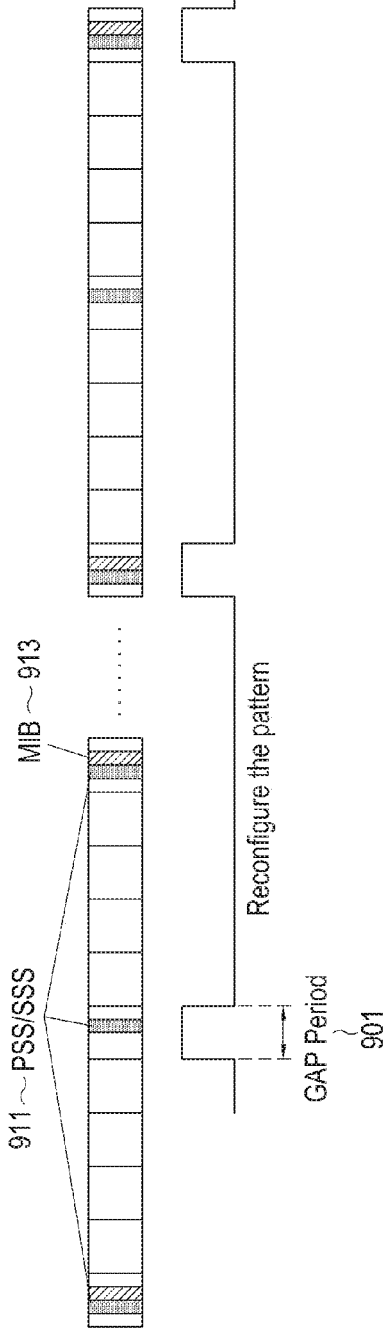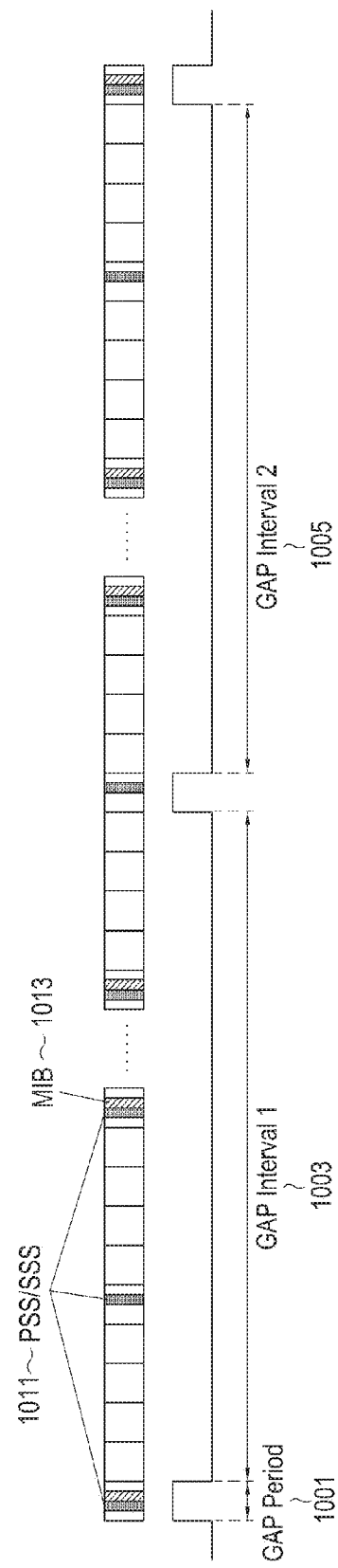
FIG.9
FIG.10

METHOD AND APPARATUS FOR REPORTING MASTER INFORMATION BLOCK DECODING STATUS OF NEIGHBOR CELL IN WIRELESS COMMUNICATION SYSTEM

CROSS-REFERENCE TO RELATED APPLICATION(S)

This application is a continuation application of prior application Ser. No. 14/661,387, filed on Mar. 18, 2015, which claims the benefit under 35 U.S.C. § 119(a) of an Indian patent application filed on Mar. 18, 2014 in the Indian Patent Office and assigned Serial number 339/KOL/2014, and of an Indian patent application filed on Apr. 25, 2014 in the Indian Patent Office and assigned Serial number 492/KOL/2014, the entire disclosure of each of which is hereby incorporated by reference.

TECHNICAL FIELD

The present disclosure relates to a communication method and apparatus for an activation of a neighbor cell in a wireless communication system.

BACKGROUND

In 3$^{rd}$ Generation Partnership Project (3GPP) Release 12, dual connectivity (DC) is being standardized, wherein a user equipment (UE) can be simultaneously connected to a master evolved Node B (MeNB) of a macrocell and a secondary eNB (SeNB) of a picocell. The primary motivation of DC is data boosting by using a large number of picocells in hotspots. However, this leads to highly decreased mobility robustness because the UE needs to perform frequent handovers due to the small size of the picocells. In order to overcome this issue, the architecture of DC is used in which mobility is handled by an umbrella macrocell.

In this new architecture of DC, the UE may be allocated an uplink data channel in both an MeNB and an SeNB. It is to be noted that an MeNB is considered a controller for many control plane functionalities, but a data plane is largely independently performed in each of an MeNB and an SeNB. The primary reason is that an inter-eNB communication delay is much higher than the typical scheduling interval. The inter-eNB communication incurs a delay of 2 to 6 ms which is magnitudes higher than the scheduling delay of 1 ms. Accordingly, an eNB performs its own scheduling. This can also be considered as inter-eNB carrier aggregation (CA).

Further, in DC, it is agreed that the cells of an MeNB are referred to as a primary cell group, and one cell of an MeNB is treated as a primary cell (Pcell). The cells of an SeNB are referred to as a secondary cell group, and one cell of an SeNB is treated as a primary cell of the secondary cell group and is referred to as a primary secondary cell (pScell).

In such a DC system, the cells of an MeNB and an SeNB may not be synchronized at a physical layer (PHY) level. Further, a system frame number (SFN) may not be synchronized between the cells of the MeNB and the SeNB. In such a system, even when the system information of the SeNB cells can be provided to a UE before the addition of a cell via the MeNB Pcell, the UE will be unable to communicate with the "new" cell of the SeNB immediately because it will not be SFN synchronized with the "new" cell. In this case, the UE will be unaware of the SFN corresponding to a radio frame in the new cell.

The SFN is included in a master information block (MIB) broadcasted by a cell. The MIB is, for example, broadcasted every 40 ms. The broadcasted SFN in the MIB corresponds to the frame in which the MIB is received. Based on the reception of the MIB, the UE will become SFN synchronized with the new cell. Further, it is to be noted that although the MIB of the new cell can also be provided to the UE like a system information block (SIB) via the MeNB Pcell, but the SFN information cannot be provided because there will be a delay between information transfer between the SeNB and MeNB and thus the provided SFN will not correspond to the correct radio frame, as a result of which the UE will be unable to communicate with the new cell.

If the SFN offset between an MeNB secondary cell (Scell) and an SeNB Scell is known to the MeNB, then the MeNB can signal the offset to the UE and then UE can become SFN synchronized with the SeNB Scell because it will be already aware of the SFN in the MeNB Pcell. However, it cannot be guaranteed that the MeNB can always know the offset between the MeNB and the SeNB. This may occur, for example, when the MeNB and the SeNB belong to different operators.

In such a system, when the MeNB wants to add a new cell in the secondary cell group, it can signal the new cell addition to the UE, but the SeNB cannot activate the new cell immediately because the UE may not have decoded the MIB which contains the SFN of the SeNB. The SeNB may need to give a sufficient time delay prior to the activation of the new cell so that the UE can decode the MIB directly broadcasted from the new cell. This delays the activation of the new cell.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently reporting a master information block (MIB) decoding status for an activation of a neighbor cell in a wireless communication system.

Another aspect of the present disclosure is to provide various gap patterns for the MIB decoding of a neighbor cell in a wireless communication system.

Another aspect of the present disclosure is to provide a method and apparatus for reporting, by a user equipment (UE), the system frame number (SFN) offset between a neighbor cell for which an MIB has been decoded and a primary serving cell in a wireless communication system.

In accordance with an embodiment of the present disclosure, a method for reporting an MIB decoding status of a neighbor cell in a wireless communication system is provided. The method includes receiving, by a user equipment (UE) and from an evolved Node B (eNB) of a serving cell, neighbor cell-related information for receiving an MIB of the neighbor cell, based on the neighbor-cell related information, decoding, by the UE, the MIB of the neighbor cell, and transmitting, by the UE, decoding information of the MIB to the eNB of the serving cell.

In accordance with another embodiment of the present disclosure, a UE in a wireless communication system is provided. The UE includes a transceiver configured to transmit and receive data with an eNB, and a controller configured to control the UE to receive, from the eNB of a serving cell, neighbor cell-related information for receiving an MIB of a neighbor cell, to decode the MIB of the neighbor cell, based on the neighbor-cell related information, and to transmit decoding information of the MIB to the eNB of the serving cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7, 8, 9, and 10 are views illustrating various examples of a gap pattern for MIB decoding of a neighbor cell in a wireless communication system according to various embodiments of the present disclosure;

Throughout the drawings, it should be noted that like reference numbers are used to depict the same or similar elements, features, and structures.

DETAILED DESCRIPTION

Figure 1A:
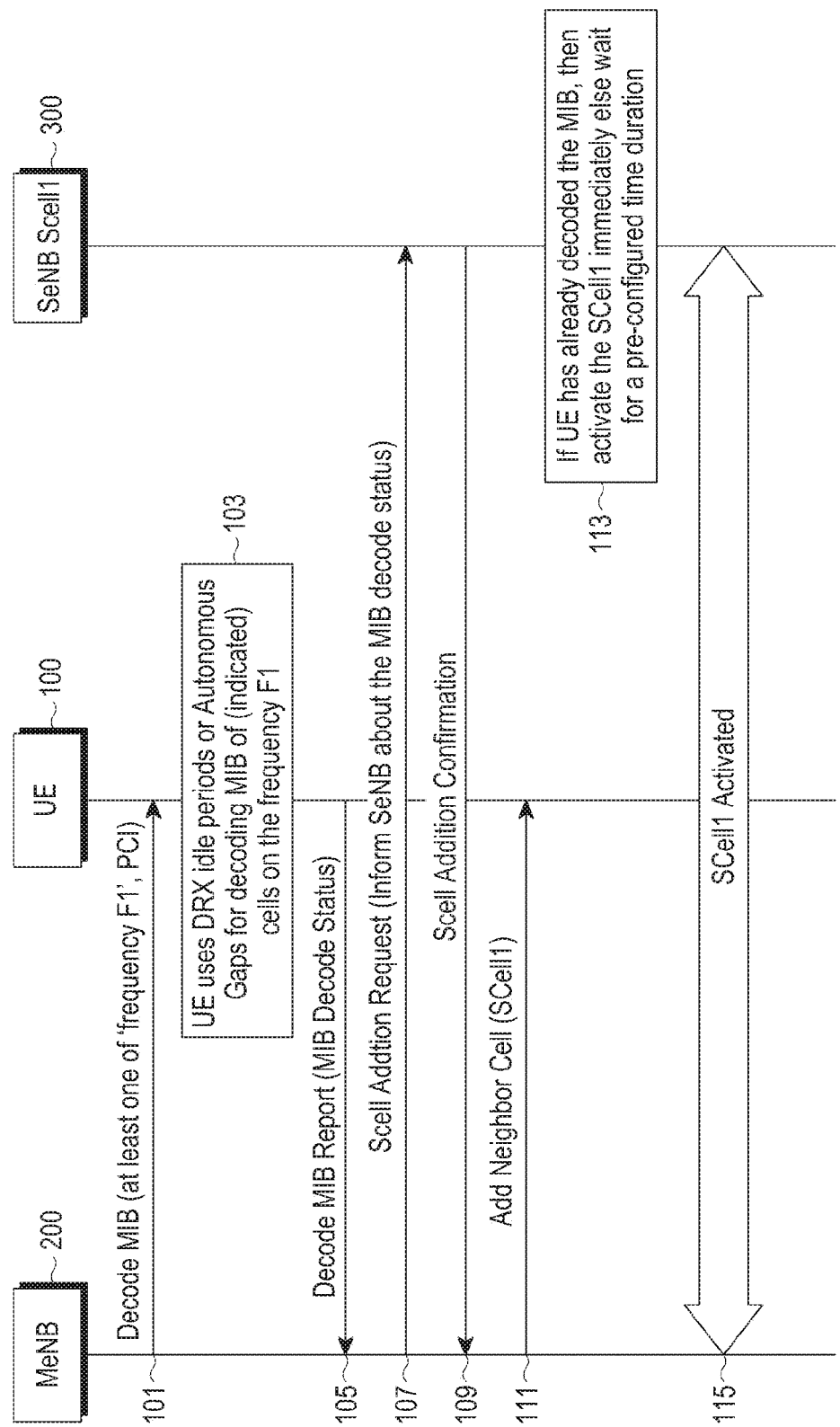
FIGS. 1A, 1B, 2, 3, 4, 5, and 6 are flow diagrams illustrating various examples of a procedure of reporting a master information block (MIB) decoding status for an activation of a neighbor cell in a wireless communication system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 12, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

In an embodiment of the present disclosure, a user equipment (UE) may be configured by a master evolved NodeB (MeNB) to decode system frame numbers (SFNs) of neighbor cells during a measurement of the neighbor cells. This may be particularly useful in dual connectivity (DC) for reducing a delay in an activation of a newly added small cell. The UE can be configured by the MeNB to report the decoding of a master information block (MIB) of a neighbor cell. If the UE indicates, to the MeNB, that it has successfully decoded the MIB of a neighbor cell, then the MeNB can activate the corresponding neighbor cell earlier because, if the UE has not been able to decode the MIB of the neighbor cell, then the MeNB needs to give a sufficient delay in the activation of the neighbor cell so that the UE can decode the MIB prior to the activation of the corresponding neighbor cell. An embodiment of the present disclosure for implementing this is as shown in FIG. 1A.

FIG. 1A is a flow diagram illustrating an example of a procedure of reporting an MIB decoding status for an activation of a neighbor cell in a wireless communication system according to an embodiment of the present disclosure.

Referring to FIG. 1A, a flow diagram of an MeNB 200, a UE 100 and a secondary evolved NodeB (SeNB) secondary cell (Scell1) 300 is illustrated, such that in operation 101, the MeNB 200 instructs the UE 100 to report a decoding of and/or to performing a decoding of the MIB of a neighbor cell (e.g., the SeNB Scell1 300). A message for this report includes at least one of the frequency F1 and the physical cell identifier (PCI) of the neighbor cell. The frequency specified in the measurement object may include a single frequency or a plurality of frequencies.

In operation 103, the UE 100 uses discontinuous reception (DRX) idle periods or autonomous gaps to decode the MIB of an indicated cell (e.g., the SeNB Scell1 300) on the frequency F1 of the neighbor cell (e.g., the SeNB Scell1 300).

Next, in operation 105, the UE 100 reports, to the MeNB 200, information indicating whether it has successfully decoded the MIB (e.g., MIB decode status).

Subsequently, as shown in operations 107, 109, 111, 113 and 115 of FIG. 1A, a series of operations for activating the neighbor cell (e.g., the SeNB Scell1 300) are performed between the UE 100, the MeNB 200, and the SeNB Scell1 300 based on the MIB decode status.

Specifically, in operation 107 the MeNB 200 transmits, to the SeNB Scell1 300, a Scell addition request to inform the SeNB Scell1 300 about the MIB decode status.

In operation 109 the SeNB Scell1 300 transmits an Scell addition confirmation to the MeNB 200.

In operation 111 the MeNB 200 transmits a request to add a neighbor cell to the UE 100.

In operation 113, if the UE 100 has already decoded the MIB, then the SeNB Scell1 300 can activate the neighbor cell (e.g., the SeNB Scell1 300) immediately without waiting for a pre-configured time duration.

In operation 115 the SeNB Scell1 300 is activated.

In the following descriptions of FIGS. 1B to 6, the neighbor cell will be assumed as one SeNB Scell1 for the convenience of description.

In an embodiment of the present disclosure, an MeNB configures, in a measurement configuration, that a UE needs to decode system frame numbers (SFNs) of neighbor cells on a frequency specified in the measurement object. When a measurement report is triggered, the UE reports a decode status in the measurement report. An embodiment of the present disclosure for implementing this is as shown in FIG. 1B.

Figure 1B:
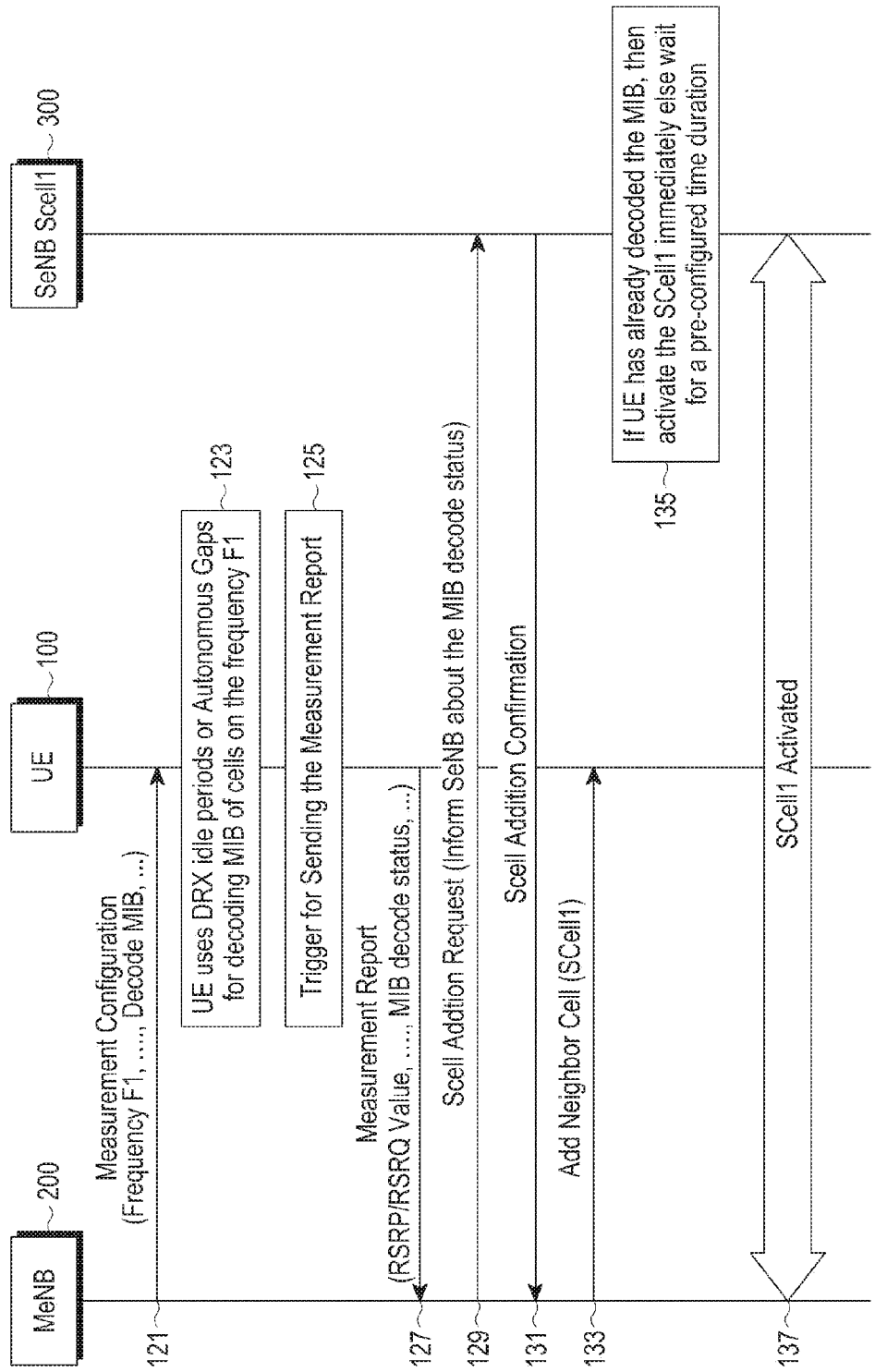

FIG. 1B is a flow diagram illustrating an example of a procedure of reporting an MIB decoding status for an activation of a neighbor cell in a wireless communication system according to an embodiment of the present disclosure.

Referring to FIG. 1B, a flow diagram of an MeNB 200, a UE 100 and a secondary evolved NodeB (SeNB) secondary cell (Scell1) 300 is illustrated, such that in operation 121, the MeNB 200 sends a message for a measurement configuration to the UE 100. The message for the measurement configuration includes a frequency F1 of a neighbor cell (e.g., the SeNB Scell1 300) and information indicating the MIB decoding of the neighbor cell (e.g., SeNB Scell1 300) on the frequency F1 (Decode MIB). The frequency specified in the measurement object may include a single frequency or a plurality of frequencies. The MIB includes the SFN information of the neighbor cell.

In operation 123, the UE 100 uses DRX idle periods or autonomous gaps to decode the MIB of an indicated cell (e.g., the SeNB Scell1 300) on the frequency F1 of the neighbor cell (e.g., the SeNB Scell1 300).

In operations 125 and 127, when a measurement report is triggered, the UE 100 reports the MIB decode status of the neighbor cell (e.g., the SeNB Scell1 300) to the MeNB 200 through the measurement report indicating, for example, a reference signal received power (RSRP)/reference signal received quality (RSRQ) value and the MIB decode status.

Subsequently, as shown in operations 129, 131, 133, 135 and 137 of FIG. 1B, a series of operations for activating the neighbor cell (e.g., the SeNB Scell1 300) are performed between the UE 100, the MeNB 200, and the SeNB 300 based on the MIB decode status.

Specifically, in operation 129 the MeNB 200 transmits, to the SeNB Scell1 300, a Scell addition request to inform the SeNB Scell1 300 about the MID status.

In operation 131 the SeNB Scell1 300 transmits an Scell addition confirmation to the MeNB 200.

In operation 133 the MeNB 200 transmits a request to add a neighbor cell to the UE 100.

In operation 135, if the UE 100 has already decoded the MIB, then the SeNB Scell1 300 can activate the neighbor cell (e.g., the SeNB Scell1 300) immediately without waiting for a pre-configured time duration.

In operation 137 the SeNB Scell1 300 is activated.

In an embodiment of the present disclosure, an MeNB may configure, in the measurement configuration, one or more cells indicated by their PCI for which a UE needs to perform the MIB decoding. When a measurement report is triggered, the UE reports the MIB decode status of the neighbor cell in the measurement report.

In an embodiment of the present disclosure, a UE may autonomously attempt to decode the MIBs of neighbor cells on the frequency listed in the measurement object using either DRX idle periods or using autonomous gaps. In this case, the measurement object does not explicitly indicate whether the UE needs to decode the MIB. When a measurement report is triggered, the UE reports the MIB decode status in the measurement report. An embodiment of the present disclosure for implementing this is as shown in FIG. 2.

Figure 2:
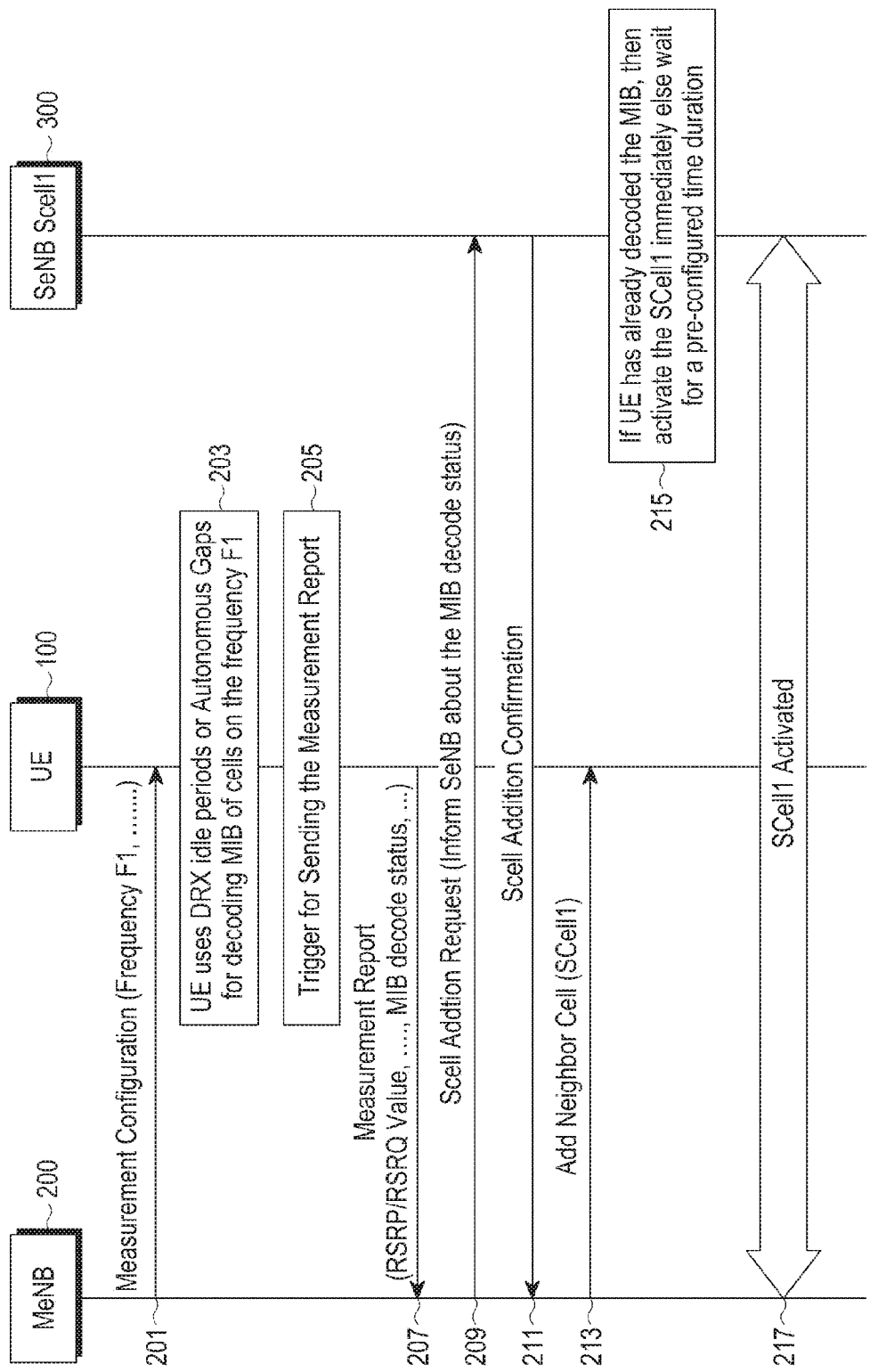

FIG. 2 is a flow diagram illustrating an example of a procedure of reporting an MIB decoding status for an activation of a neighbor cell in a wireless communication system according to an embodiment of the present disclosure.

Referring to FIG. 2, a flow diagram of an MeNB 200, a UE 100 and a secondary evolved NodeB (SeNB) secondary cell (Scell1) 300 is illustrated, such that in operation 201, the MeNB 200 sends a message for a measurement configuration to the UE 100. The message for the measurement configuration may include a single frequency or a plurality of frequencies (e.g., F1, etc.) specified in the measurement object.

In operation 203, the UE 100 uses DRX idle periods or autonomous gaps to decode the MIB of an indicated cell (e.g., the SeNB Scell1 300) on the frequency F1 of the neighbor cell (e.g., the SeNB Scell1 300). At this time, the UE may autonomously attempt to decode the MIBs of neighbor cells on the frequency listed in the measurement object.

In operations 205 and 207, when a measurement report is triggered, the UE 100 reports the MIB decode status of the neighbor cell (e.g., the SeNB Scell1 300) to the MeNB 200 through the measurement report indicating, for example, an RSRP/RSRQ value and the MIB decode status.

Subsequently, in operations 209, 211, 213, 215 and 217 of FIG. 2, a series of operations for activating the neighbor cell (e.g., the SeNB Scell1 300) are performed between the UE 100, the MeNB 200, and the SeNB 300 based on the MIB decode status.

Specifically, in operation 209 the MeNB 200 transmits, to the SeNB Scell1 300, a Scell addition request to inform the SeNB Scell1 300 about the MID status.

In operation 211 the SeNB Scell1 300 transmits an Scell addition confirmation to the MeNB 200.

In operation 213 the MeNB 200 transmits a request to add a neighbor cell to the UE 100.

In operation 215, if the UE 100 has already decoded the MIB, then the SeNB Scell1 300 can activate the neighbor cell (e.g., the SeNB Scell1 300) immediately without waiting for a pre-configured time duration.

In operation 217 the SeNB Scell1 300 is activated.

In an embodiment of the present disclosure, a measurement report is triggered when a UE completes the decoding of the MIB for at least one cell on the frequency configured in the measurement configuration or for at least one of the cells configured in the measurement configuration.

In an embodiment of the present disclosure, if a UE is not able to decode the MIB of a neighbor cell, then it may indicate the unavailability of the MIB of the neighbor cell to a serving cell so that when the neighbor cell needs to be added (for dual connectivity) to the serving cell, the serving cell can activate the neighbor cell after giving sufficient time to the UE for decoding the MIB of the corresponding neighbor cell prior to its activation. The UE may signal to the MeNB of the serving cell by adding an MIB decoded indicator, which indicates whether the MIB has been decoded, in a measurement report corresponding to each neighbor cell.

In an embodiment of the present disclosure, the MIB decoded indicator may be optionally present to indicate the unavailability of the MIB for a cell(s) in the reported cell list. If the MIB decoded indicator is not present, then the MeNB of the serving cell may assume that the UE has successfully received the MIB of the corresponding cell(s) in the reported cell list. Alternatively, the MIB decoded indicator may be optionally present to indicate the availability of the MIB of the corresponding cell in the reported cell list. An embodiment of the present disclosure for implementing this is as shown in FIG. 3.

Figure 3:
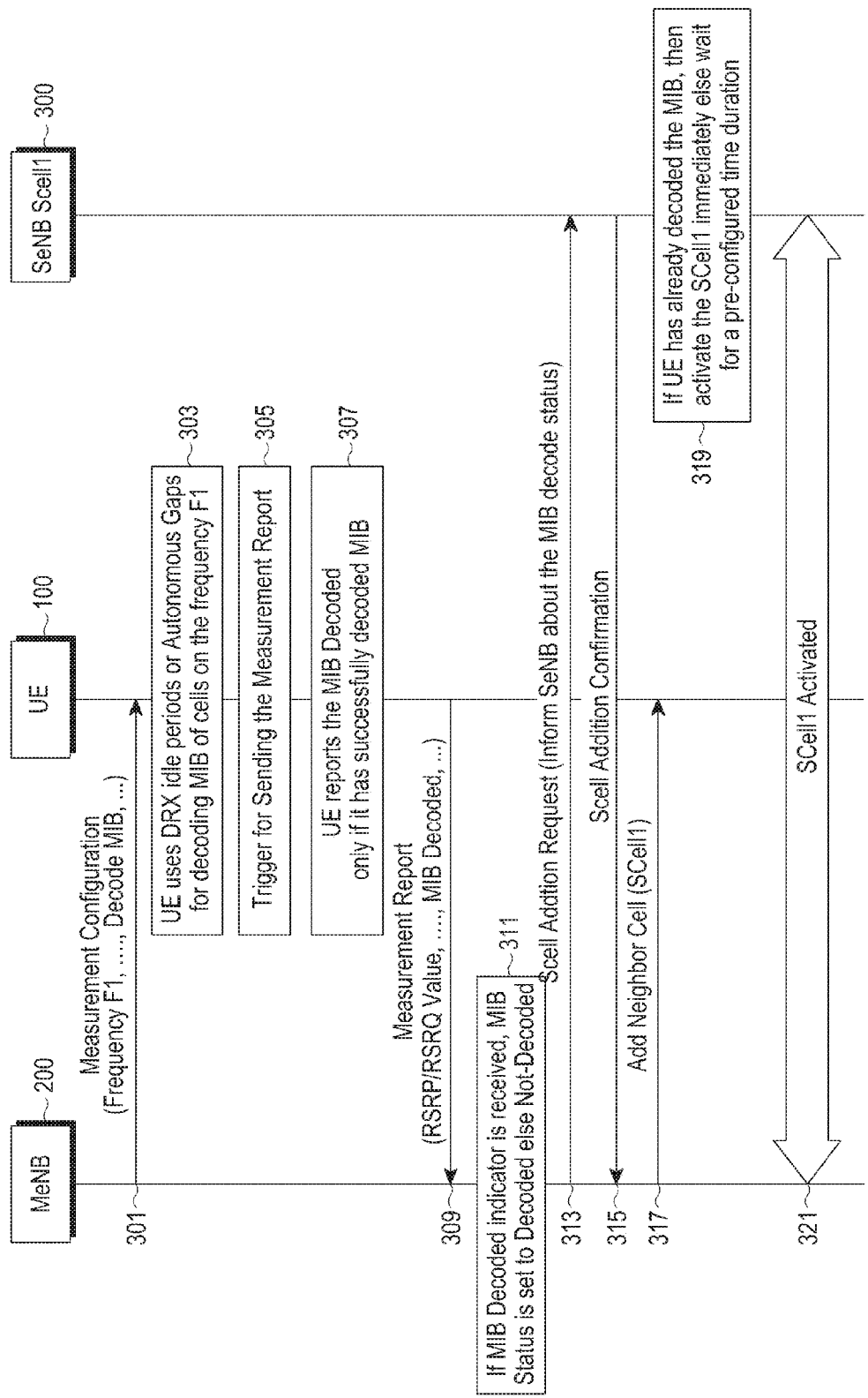

FIG. 3 is a flow diagram illustrating an example of a procedure of reporting an MIB decoding status for an activation of a neighbor cell in a wireless communication system according to an embodiment of the present disclosure.

Referring to FIG. 3, a flow diagram of an MeNB 200, a UE 100 and a secondary evolved NodeB (SeNB) secondary cell (Scell1) 300 is illustrated, such that in operation 301, the MeNB 200 sends a message for a measurement configuration to the UE 100. The message for the measurement configuration includes a frequency F1 of a neighbor cell (e.g., the SeNB Scell1 300) and information indicating MIB decoding of the neighbor cell (e.g., the SeNB Scell1 300) on the frequency F1 (Decode MIB). The frequency specified in the measurement object may include a single frequency or a plurality of frequencies.

In operation 303, the UE 100 uses DRX idle periods or autonomous gaps to decode the MIB of an indicated cell (e.g., the SeNB Scell1 300) on the frequency F1 of the neighbor cell (e.g., the SeNB Scell1 300).

When a measurement report is triggered in operation 305, the UE 100 sends the measurement report corresponding to each neighbor cell, which carries the MIB decoded indicator indicating whether the MIB has been decoded, to the MeNB 200 through the measurement report in operations 307 and 309. The measurement report transmitted in operation 309 indicates, for example, an RSRP/RSRQ value and the MIB decode status.

As an alternative, the MIB decoded indicator may be included in the measurement report only when the MIB has been successfully decoded.

In operation 311, upon receiving the MIB decoded indicator, the MeNB 200 can identify whether the MIB has been decoded.

Subsequently, in operations 313, 315, 317, 319 and 321 of FIG. 3, a series of operations for activating the neighbor cell (e.g., the SeNB Scell1 300) are performed between the UE 100, the MeNB 200, and the SeNB 300 based on the MIB decode status.

Specifically, in operation 313 the MeNB 200 transmits, to the SeNB Scell1 300, a Scell addition request to inform the SeNB Scell1 300 about the MID status.

In operation 315 the SeNB Scell1 300 transmits an Scell addition confirmation to the MeNB 200.

In operation 317 the MeNB 200 transmits a request to add a neighbor cell to the UE 100.

In operation 319, if the UE 100 has already decoded the MIB, then the SeNB Scell1 300 can activate the neighbor cell (e.g., the SeNB Scell1 300) immediately without waiting for a pre-configured time duration.

In operation 321 the SeNB Scell1 300 is activated.

In an embodiment of the present disclosure, a timer may be used by a UE to monitor the MIB of a neighbor cell and inform an MeNB of the success or failure of decoding the MIBs of neighbor cells on the frequency configured in the measurement object. In this embodiment of the present disclosure, a measurement report including the MIB decode status is sent at the expiration of the timer.

Further, if the UE completes the decoding of the MIB prior to the expiration of the timer, then it stops the timer and triggers a measurement report including the MIB decode status. The timer may be pre-specified or may be configured by an MeNB, for example, in the measurement configuration. The measurement report is triggered by the expiration of the timer. An embodiment of the present disclosure for implementing this is as shown in FIG. 4.

Figure 4:
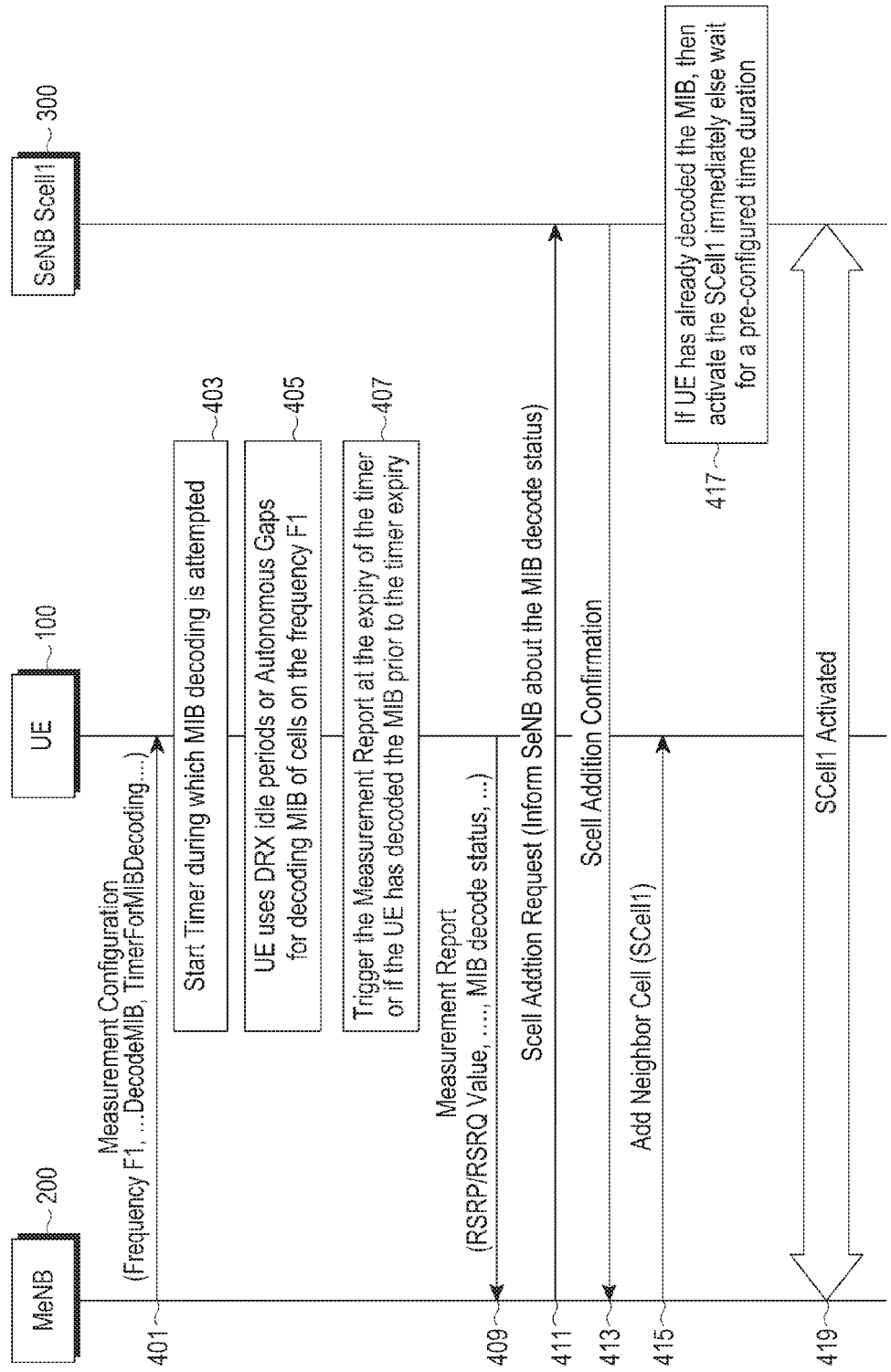

FIG. 4 is a flow diagram illustrating an example of a procedure of reporting an MIB decoding status for an activation of a neighbor cell in a wireless communication system according to an embodiment of the present disclosure.

Referring to FIG. 4, a flow diagram of an MeNB 200, a UE 100 and a secondary evolved NodeB (SeNB) secondary cell (Scell1) 300 is illustrated, such that in operation 401, the MeNB 200 sends a message for a measurement configuration to the UE 100. The message for measurement configuration includes a frequency F1 of a neighbor cell (e.g., the SeNB Scell1 300), information indicating MIB decoding of the neighbor cell (e.g., the SeNB Scell1 300) on the frequency F1 (e.g., decode MIB), and a timer (e.g., TimerForMIBDecoding) used by the UE 100 to monitor the MIB of the neighbor cell (e.g., the SeNB Scell1 300) and inform the MeNB 200 of the success or failure of decoding the MIB of the neighbor cell (e.g., the SeNB Scell1 300) on the frequency configured in the measurement object. The frequency specified in the measurement object may include a single frequency or a plurality of frequencies.

In operation 403, the UE 100 starts the timer while attempting the MIB decoding.

In operation 405, the UE 100 uses DRX idle periods or autonomous gaps to decode the MIB of the indicated cell (e.g., the SeNB Scell1 300) on the frequency F1 of the neighbor cell (e.g., the SeNB Scell1 300).

In operation 407, the UE 100 completes the MIB decoding prior to the expiration of the timer or stops the timer and triggers a measurement report including the MIB decode status at the expiration of the timer.

When the measurement report is triggered, in operation 409, the UE 100 reports the MIB decode status of the neighbor cell (e.g., the SeNB Scell1 300) to the MeNB 200 through the measurement report indicating, for example, an RSRP/RSRQ value and the MIB decode status.

Subsequently, in operations 411, 413, 415, 417 and 419 of FIG. 4, a series of operations for activating the neighbor cell (e.g., the SeNB Scell1 300) are performed between the UE 100, the MeNB 200, and the SeNB 300 based on the MIB decode status.

Specifically, in operation 411 the MeNB 200 transmits, to the SeNB Scell1 300, a Scell addition request to inform the SeNB Scell1 300 about the MID status.

In operation 413 the SeNB Scell1 300 transmits an Scell addition confirmation to the MeNB 200.

In operation 415 the MeNB 200 transmits a request to add a neighbor cell to the UE 100.

In operation 417, if the UE 100 has already decoded the MIB, then the SeNB Scell1 300 can activate the neighbor cell (e.g., the SeNB Scell1 300) immediately without waiting for a pre-configured time duration.

In operation 419 the SeNB Scell1 300 is activated.

In an embodiment of the present disclosure, an MIB decode status report may be configured by an MeNB for the sending of a measurement report by a UE. In such a scheme, the UE attempts to decode the MIB of a neighbor cell and reports, to the MeNB, whether it has successfully decoded the MIB of the neighbor cell in one or more measurement report occasions as per the measurement report configured by the MeNB.

In an embodiment of the present disclosure, a periodic measurement report may be configured for the MIB decode status report. An embodiment of the present disclosure for implementing this is as shown in FIG. 5.

Figure 5:
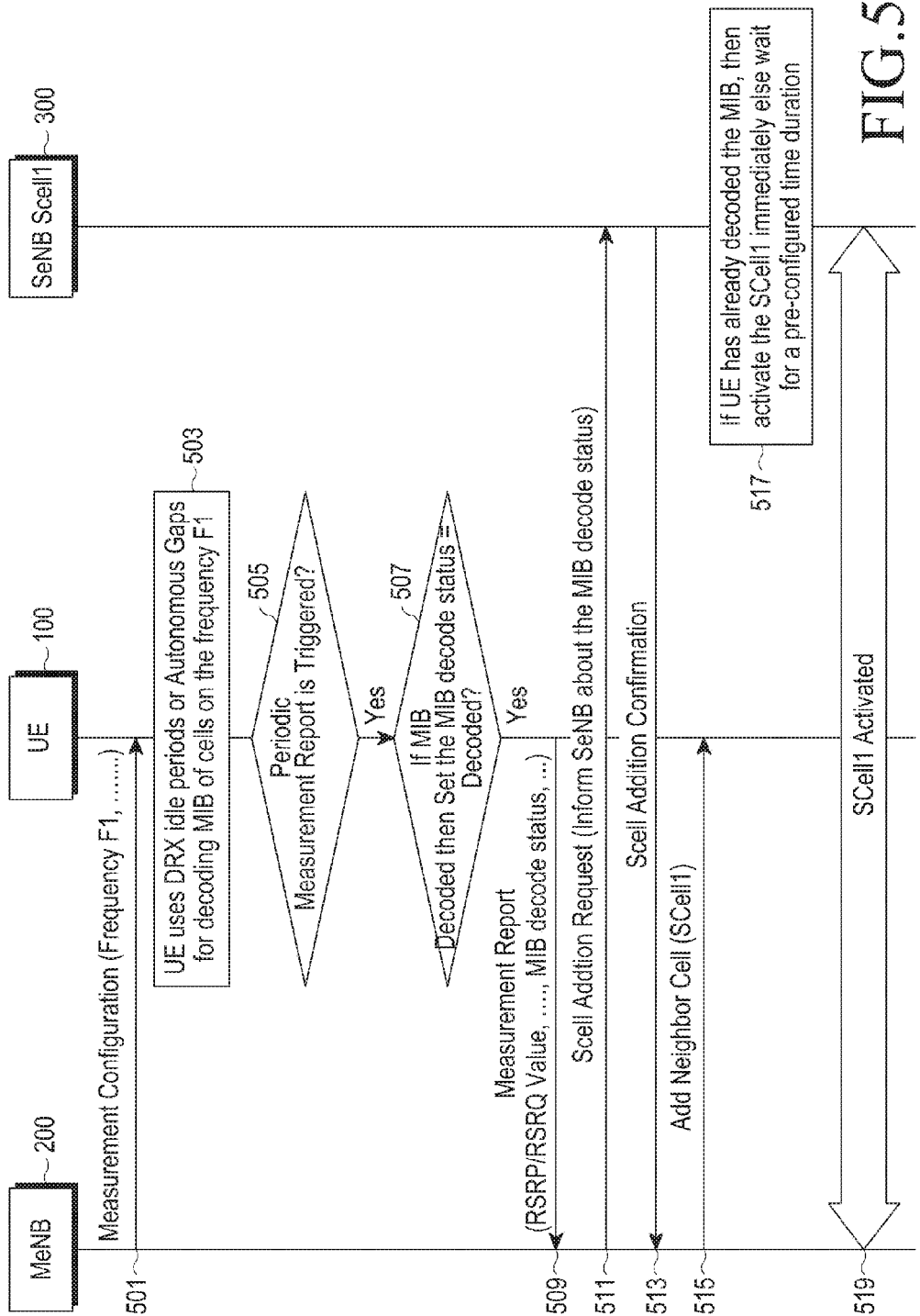

FIG. 5 is a flow diagram illustrating an example of a procedure of reporting an MIB decoding status for an activation of a neighbor cell in a wireless communication system according to an embodiment of the present disclosure.

Referring to FIG. 5, a flow diagram of an MeNB 200, a UE 100 and a secondary evolved NodeB (SeNB) secondary cell (Scell1) 300 is illustrated, such that in operation 501, the MeNB 200 sends a message for a measurement configuration to the UE 100. The message for the measurement configuration may include a single frequency or a plurality of frequencies (e.g., F1, etc.) specified in the measurement object.

In operation 503, the UE 100 uses DRX idle periods or autonomous gaps to decode the MIB of an indicated neighbor cell (e.g., the SeNB Scell1 300) on the frequency F1 of the neighbor cell (e.g., the SeNB Scell1 300).

The UE 100 determines in operation 505 whether a periodic measurement report is triggered, and when a periodic measurement report is triggered, determines in operation 507 whether the MIB of the neighbor cell (e.g., the SeNB Scell1 300) has been successfully decoded.

If the MIB has been successfully decoded, then the UE 100 sets the MIB decode status to "Decoded", and in operation 509, and reports the MIB decode status of the neighbor cell (e.g., the SeNB Scell1 300) to the MeNB 200 through the measurement report indicating, for example, an RSRP/RSRQ value and the MIB decode status. Although not shown in the drawing, if a periodic measurement report is not triggered in operation 505 or the result of the determination in operation 507 shows that the MIB has been unsuccessfully decoded, then the UE 100 waits for a periodic measurement report to be triggered or performs a predetermined operation.

In operations 511, 513, 515, 517 and 519 of FIG. 5, a series of operations for activating the neighbor cell (e.g., the SeNB Scell1 300) are performed between the UE 100, the MeNB 200, and the SeNB 300 based on the MIB decode status.

Specifically, in operation 511 the MeNB 200 transmits, to the SeNB Scell1 300, a Scell addition request to inform the SeNB Scell1 300 about the MID status.

In operation 513 the SeNB Scell1 300 transmits an Scell addition confirmation to the MeNB 200.

In operation 515 the MeNB 200 transmits a request to add a neighbor cell to the UE 100.

In operation 517, if the UE 100 has already decoded the MIB, then the SeNB Scell1 300 can activate the neighbor cell (e.g., the SeNB Scell1 300) immediately without waiting for a pre-configured time duration.

In operation 519 the SeNB Scell1 300 is activated.

In an embodiment of the present disclosure, a UE may be expected to use DRX inactivity periods (OFF periods) for MIB decoding. In this method, the UE uses the OFF periods in the active mode DRX configuration with an MeNB or with another cell of an SeNB to decode the MIB of a neighbor cell. A decision on whether to use the DRX configuration of an MeNB or an SeNB depends on the radio frequency (RF) capability of the UE. For example, the RF used for communicating with an MeNB may be incapable of monitoring the frequency of an intended neighboring small cell. In such a case, the RF used for communicating with the serving cell of a SeNB may be used.

If both the RFs are capable of monitoring the frequency of the intended neighboring cell, the UE may choose the DRX configuration which has a larger OFF duration. Alternatively the UE may choose the RF that is used close to the band of the intended neighbor cell. Alternatively, the UE may use more than one RF chain to monitor the MIBs of multiple neighbor cells on different frequencies at the same time.

In an embodiment of the present disclosure, a UE may be expected to use autonomous gaps to decode the MIBs of neighbor cells. In the autonomous gaps, the UE deliberately creates gaps, for example, by missing the downlink (DL) of the current serving cell and/or by delaying transmission to the serving cell. The decision on whether to create autonomous gaps with MeNB or SeNB cells may depend on the amount of data transfer with each cell. For example, the UE may choose a cell with a smaller data rate.

Alternatively, the UE may choose a cell with less important data traffic. For example, the UE may choose to create autonomous gaps on a small cell (e.g., a SeNB) because an MeNB carries critical radio resource control (RRC) signaling. Alternatively, the UE may choose to create autonomous gaps based on the suitability of the RF for the band of the intended neighbor cell.

In an embodiment of the present disclosure, a UE may be configured by an MeNB to use one of autonomous gaps and idle DRX periods for the purpose of MIB decoding.

A UE may be expected to decode the SFN in a relaxed manner, which implies that the UE is not required to decode the SFN for every measurement. For example, the UE may be configured to decode the SFN once during a pre-configured time interval. An MeNB may configure this time period in the measurement configuration. Alternatively, this time period may be pre-specified. Alternatively, the choice of whether to decode the SFN during every measurement occasion or only during few measurement occasions may be left to the UE.

In an embodiment of the present disclosure, a UE may prioritize the decoding of the MIBs of cells having higher RSRP/RSRQ measurement values.

In an embodiment of the present disclosure, an MeNB configures the cells for which a UE is to perform MIB acquisition. The MeNB may determine the cells for which the UE is to perform MIB acquisition, based on a measurement report received from the UE.

In an embodiment of the present disclosure, a UE triggers the autonomous decoding of the MIB after a measurement report is triggered. The UE delays the sending of the measurement report until performing the MIB decoding of at least one of the cells that are to be reported in the triggered measurement report. In an embodiment of the present disclosure, the UE delays the sending of the measurement report by a pre-specified or configured time period. The UE may perform the MIB decoding within this period of time for the cells that are to be reported. At the expiration of the time period, the UE sends, to an MeNB, the measurement report including the MIB decode statuses of whatever cells it could decode during the period of time.

In an embodiment of the present disclosure, a UE triggers the autonomous decoding of the MIB of a cell if the UE finds the measurement value (RSRP/RSRQ) of the cell, exceeding a pre-specified or configured threshold, in the process of the measurement.

In an embodiment of the present disclosure, a UE triggers the autonomous decoding of the MIB of a cell if the MIB is scheduled to fall under the configured gap pattern.

In an embodiment of the present disclosure, new measurement gap patterns may be designed specifically to cater to the decoding of the MIB. Such gap patterns may be used for normal measurements as well. It is to be noted that a synchronization signal, that is, the primary synchronization signal (PSS)/secondary synchronization signal (SSS), is transmitted every 5 ms, but a physical broadcast channel (PBCH) (including MIB) is transmitted every 10 ms. The PSS/SSS is transmitted every sub-frame 0 and sub-frame 5 and the PBCH (including MIB) is transmitted every sub-frame 0. When a legacy gap pattern of 6 ms is defined, if sub-frame 0 falls within the gap pattern, then the PBCH can be decoded, and if sub-frame 5 falls within the gap pattern, then the PBCH cannot be decoded.

Accordingly, to take care of this situation, in an embodiment of the present disclosure, the gap pattern may be provided with a gap duration of at least 10 ms in some of gap occurrences. Further, the gap duration should account for the time required for retuning the receiver to the neighbor cell frequency and back to the serving cell frequency. This returning delay may, for example, be 1 ms. Accordingly, in an embodiment of the present disclosure, a new measurement pattern may be defined such that the gap duration is 11 ms, instead of 6 ms.

In an embodiment of the present disclosure, a new type of gap pattern is signaled to a UE for the purpose of decoding the MIBs of neighbor cells. This new type of gap pattern may be signaled in the measurement configuration. The UE uses the configured gap pattern to decode the MIB and indicates the MIB decode status in a measurement report. An embodiment of the present disclosure for implementing this is as shown in FIG. 6.

Figure 6:
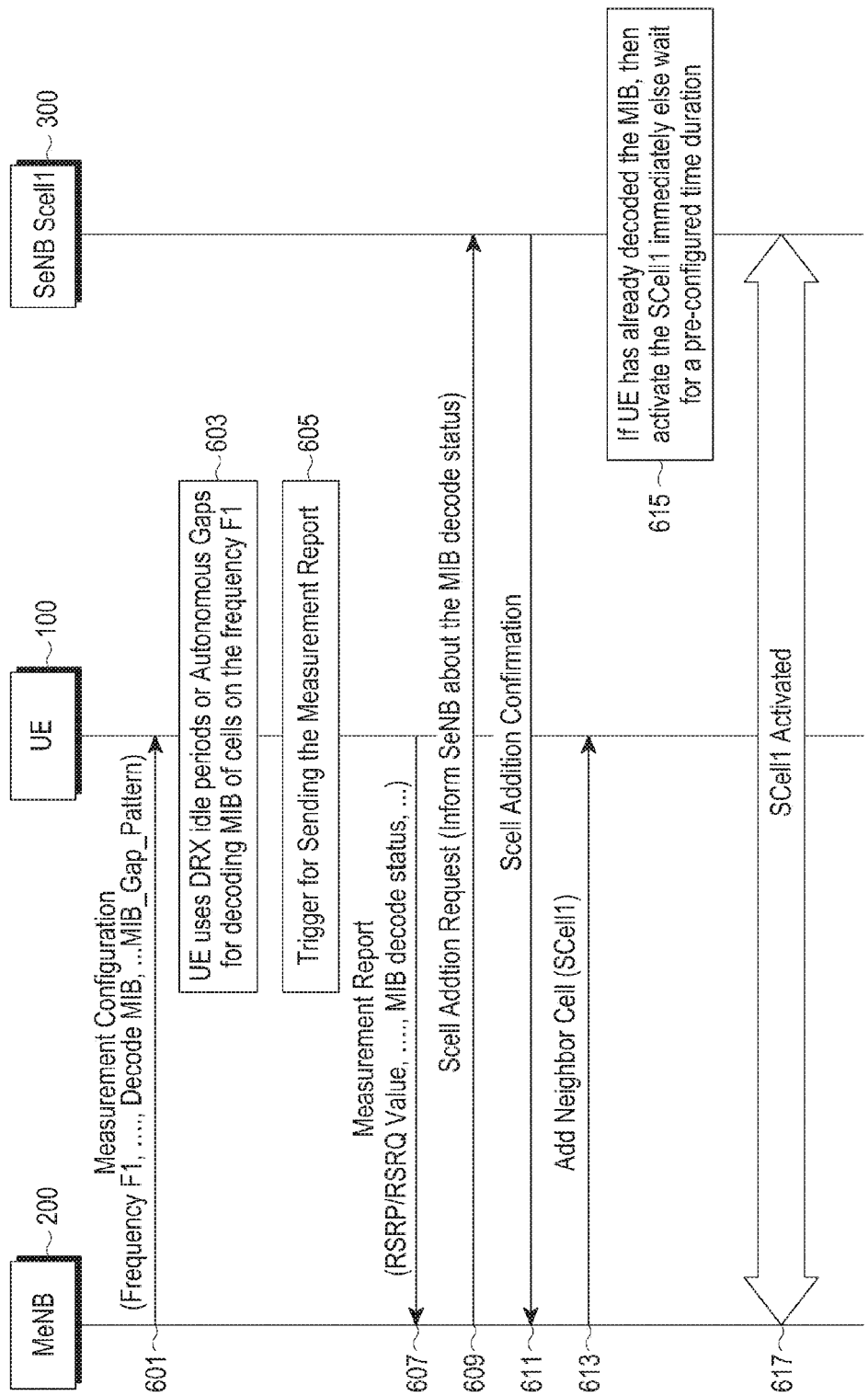

FIG. 6 is a flow diagram illustrating an example of a procedure of reporting an MIB decoding status for an activation of a neighbor cell in a wireless communication system according to an embodiment of the present disclosure.

Referring to FIG. 6, a flow diagram of an MeNB 200, a UE 100 and a secondary evolved NodeB (SeNB) secondary cell (Scell1) 300 is illustrated, such that in operation 601, the MeNB 200 sends a message for a measurement configuration to the UE 100. The message for the measurement configuration includes a frequency F1 of a neighbor cell (e.g., the SeNB Scell1 300), information indicating the MIB decoding of the neighbor cell (e.g., the SeNB Scell1 300) on the frequency F1 (e.g., Decode MIB), and gap pattern information configured for the MIB decoding of the neighbor cell (e.g., the SeNB Scell1 300) (e.g. MIB_Gap_Pattern). The frequency specified in the measurement object may include a single frequency or a plurality of frequencies.

In operation 603, the UE 100 uses DRX idle periods or autonomous gaps to decode the MIB of an indicated cell (e.g., the SeNB Scell1 300) on the frequency F1 of the neighbor cell (e.g., the SeNB Scell1 300).

In operations 605 and 607, when a measurement report is triggered, the UE 100 reports the MIB decode status of the neighbor cell (e.g., the SeNB Scell1 300) to the MeNB 200 through the measurement report indicating, for example, an RSRP/RSRQ value and the MIB decode status.

Subsequently, as shown in operations 609, 611, 613, 615 and 617 of FIG. 6, a series of operations for activating the neighbor cell (e.g., the SeNB Scell1 300) are performed between the UE 100, the MeNB 200, and the SeNB 300 based on the MIB decode status.

Specifically, in operation 609 the MeNB 200 transmits, to the SeNB Scell1 300, a Scell addition request to inform the SeNB Scell1 300 about the MID status.

In operation 611 the SeNB Scell1 300 transmits an Scell addition confirmation to the MeNB 200.

In operation 613 the MeNB 200 transmits a request to add a neighbor cell to the UE 100.

In operation 615, if the UE 100 has already decoded the MIB, then the SeNB Scell1 300 can activate the neighbor cell (e.g., the SeNB Scell1 300) immediately without waiting for a pre-configured time duration.

In operation 617 the SeNB Scell1 300 is activated.

In an embodiment of the present disclosure, a new measurement gap pattern may be defined such that the gap duration is 11 ms for only a few gap occurrences.

Figure 7:
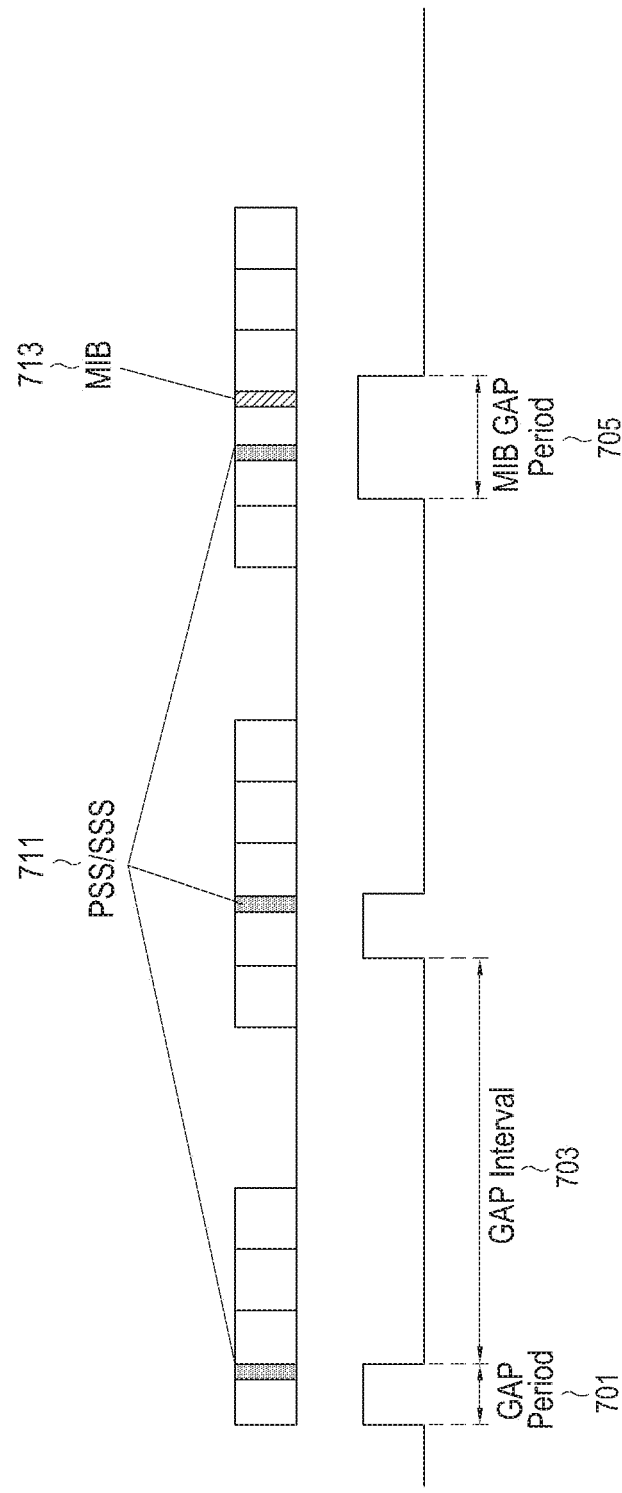

FIG. 7 is a view illustrating an example of a gap pattern for MIB decoding of a neighbor cell in a wireless communication system according to an embodiment of the present disclosure.

Referring to FIG. 7, reference numerals 711 and 713 are illustrated, where reference numeral 711 designates a synchronization signal, that is, a PSS/SSS, and reference numeral 713 designates an MIB.

Furthermore, referring to FIG. 7, for example, a gap duration (GAP Period) 701 is illustrated, where the GAP Period 701 may be normally 6 ms in the typical gap pattern, but according to an embodiment of the present disclosure, a gap duration (MIB GAP Period) 705 is 11 ms for every 'xth' gap occurrence (e.g., $10^{th}$ gap occurrence). This is required because the PBCH containing the MIB 713 is repeated every 10 ms. Reference numeral 703 indicates a gap interval between gap durations (GAP Periods).

Accordingly, a new measurement pattern proposed in an embodiment of the present disclosure may be defined as follows:

```
MeasurementPattern-for-MIB    SEQUENCE {
    Gap Period
    Gap Interval
    MIB Gap Period
    MIB Gap Interval
                                        }
```

In another example, the MeasurementPattern-for-MIB may be defined as follows:

```
SEQUENCE {
    MIB Gap Period
    MIB Gap Interval
                    }
```

In this example, the MeasurementPattern-for-MIB may be used in conjunction with the legacy measurement gap pattern. The MeNB configures both measurement patterns.

Figure 8:
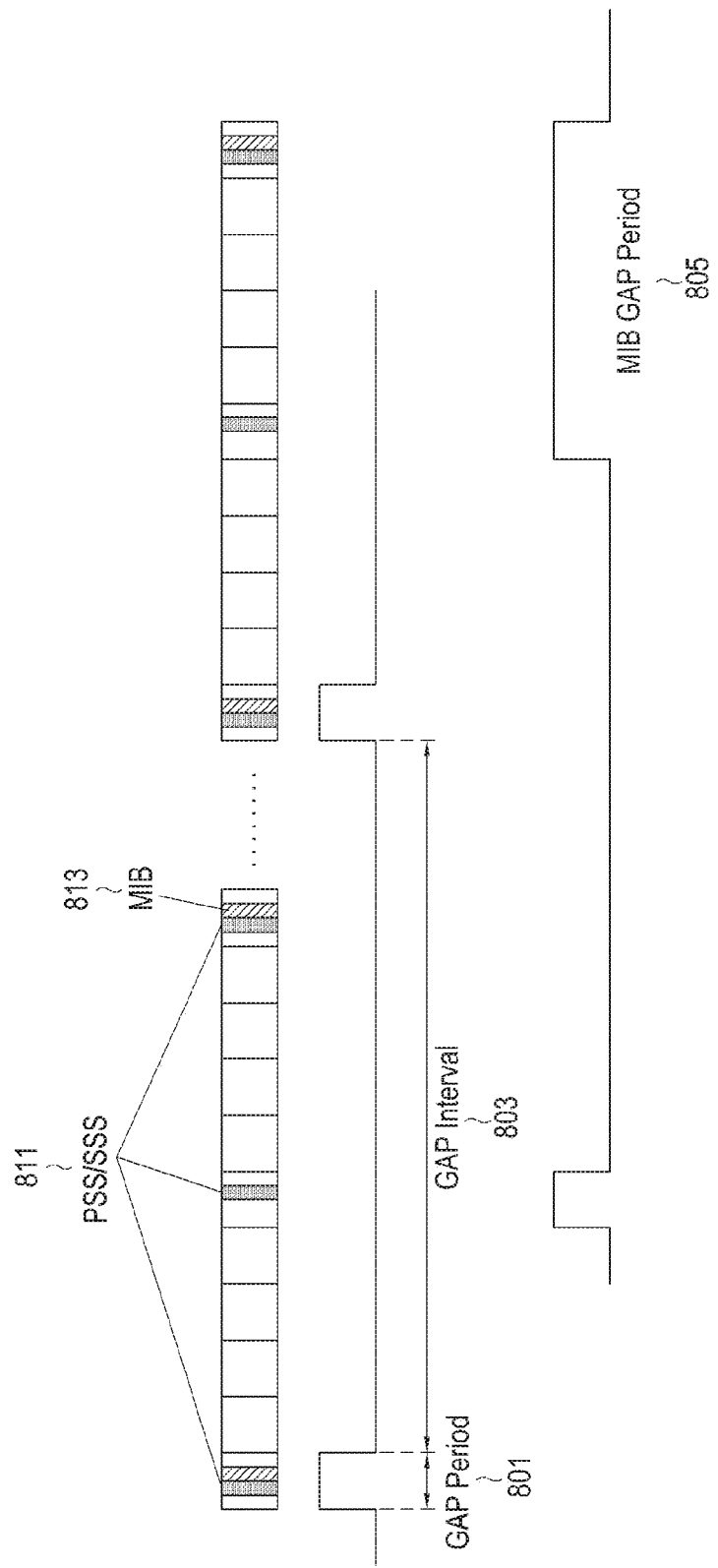

FIG. 8 is a view illustrating an example of a gap pattern for MIB decoding of a neighbor cell in a wireless communication system according to an embodiment of the present disclosure.

Referring to FIG. 8, reference numerals 811 and 813 are illustrated, where reference numeral 811 designates a synchronization signal, that is, a PSS/SSS, and reference numeral 813 designates the MIB.

Furthermore, referring to FIG. 8, an MeNB first configures a legacy measurement pattern as indicated by reference numerals 801 and 803, where reference numeral 801 is a GAP Period and reference numeral 803 is a GAP Interval. A UE attempts to decode the MIB 813 of the neighbor cell based on the configured measurement pattern. If sub-frame 0 falls within the configured legacy measurement pattern, then the UE can decode the MIB, but if sub-frame 5 falls within the configured legacy measurement pattern, then the UE cannot decode the MIB. If the UE cannot decode the MIB of the neighbor cell, then the UE informs the MeNB of this so as to configure the additional MeasurementPattern-for-MIB (MIB GAP Period) as indicated by reference numeral 805.

FIG. 9 is a view illustrating an example of a gap pattern for the MIB decoding of a neighbor cell in a wireless communication system according to an embodiment of the present disclosure.

Referring to FIG. 9, reference numerals 911 and 913 are illustrated, where reference numeral 911 designates a synchronization signal, that is, a PSS/SSS, and reference numeral 913 designates an MIB.

Further, referring to FIG. 9, if a UE cannot decode the MIB 913 using a configured legacy measurement pattern, it informs an MeNB of this, and the MeNB reconfigures the legacy measurement gap pattern with an offset of 5 sub-frames such that the UE can decode the MIB 913 using the reconfigured pattern. Reference numeral 901 designates a gap duration (GAP Period). In such a scenario, the UE may decode the MIB 913 only on one or few MIB occurrences.

FIG. 10 is a view illustrating an example of a gap pattern for MIB decoding of a neighbor cell in a wireless communication system according to an embodiment of the present disclosure.

Referring to FIG. 10, reference numerals 1011 and 1013 are illustrated, where reference numeral 1011 designates a synchronization signal, that is, a PSS/SSS, and reference numeral 1013 designates an MIB.

Referring to FIG. 10, a new measurement gap pattern may be defined such that a gap duration (GAP Period) 1001 is always 6 ms. Further, gap intervals (Gap Interval 1, Gap Interval 2) 1003, 1005 are defined such that sub-frame 0 and sub-frame 5 fall within alternate measurement occurrences. In order to realize this, the two gap intervals 1003, 1005 need to be defined such that the gap intervals alternate between the two gap durations. For example, the difference in the gap patterns is 10 sub-frames. For example, Gap Interval 1 1003 is 45 ms while Gap Interval 2 1005 is 35 ms.

This may, for example, be signaled using an additional indicator which indicates that the legacy measurement gap pattern is used in an alternate manner. For example, in one legacy gap pattern, the gap duration is 6 ms and the gap interval is 40 ms. If the alternate indication is signaled, both the UE and the MeNB use the gap intervals of 45 ms and 35 ms alternately. However, the starting gap interval needs to be specified. For example, whether the first gap interval is 45 ms or 35 ms is either specified or signaled to the UE. Alternatively, a new measurement gap pattern may be defined as follows:

---

MeasurementPattern    SEQUENCE {
    Gap Period
    Gap Interval
    AlternateIntervalIndication
    }

--- where, the AlternateIntervalIndication signals that the gap intervals should be used as Gap_Interval+5 and Gap_Interval−5 alternately while the first gap interval should be used as Gap_Interval+5.

In an embodiment of the present disclosure, the gap intervals may be alternated after a pre-specified or pre-configured number of gap occurrences. For example, the gap interval of 45 ms repeats for 10 gap occurrences and then is alternated to the gap interval of 35 ms for next 10 gap occurrences. In another example, the gaps may be alternated after an unequal number of occurrences. For example, the gap interval of 45 ms repeats for 5 gap occurrences and then is alternated to the gap interval of 35 ms for next 15 gap occurrences.

In the above embodiments of the present disclosure, a UE may be configured to report the SFN offset between a neighbor cell for which the MIB has been decoded and a primary serving cell. As an alternative, the UE may be pre-specified to report the SFN offset of the cell for which the MIB has been decoded to the serving cell. In an embodiment of the present disclosure, the SFN Offset for each cell for which the MIB is decoded is sent in a measurement report, instead of the MIB decode status.

The SFN Offset includes the difference between the SFN of a primary serving cell and a neighbor cell and also includes the "sign" of the difference. The sign indicates whether the neighbor cell has a higher SFN than the primary serving cell or whether the primary serving cell has a higher SFN than the neighbor cell. The sign may be indicated as one bit value. For example, a value of "0" may indicate that the neighbor cell has a lower SFN than the primary serving cell and a value of "1" indicates that the neighbor cell has a higher SFN than the primary serving cell.

The SFN Offset may be reported in a UE Assistance Information message defined in the $3^{rd}$ Generation Partnership Project (3GPP) long term evolution (LTE), along with the Cell ID for which the SFN Offset is reported. The Cell ID may be the global cell identity (GCI) or the physical cell identity (PCI).

Figure 11:
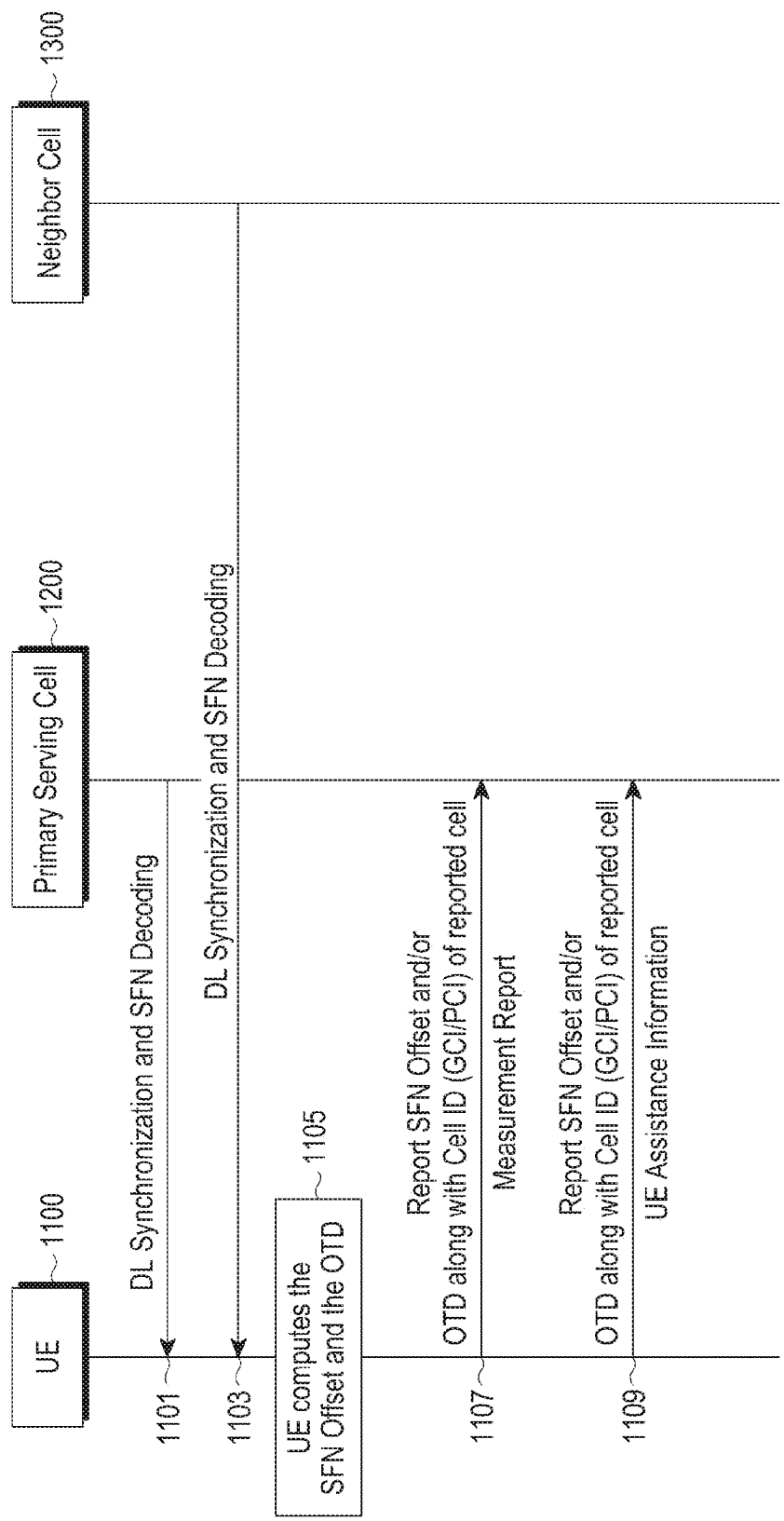
FIG. 11 is a flow diagram illustrating a method of reporting, by a user equipment (UE), a system frame number (SFN) offset between a neighbor cell for which an MIB has been decoded and a primary serving cell in a wireless communication system according to an embodiment of the present disclosure.

FIG. 11 is a flow diagram illustrating a method of reporting, by a UE, an SFN offset between a neighbor cell for which an MIB has been decoded and a primary serving cell in a wireless communication system according to an embodiment of the present disclosure.

Referring to FIG. 11, a flow diagram of a UE 1100, a primary serving cell 1200 and a neighbor cell 1300 is illustrated, such that in operation 1101, the UE 1100 performs (DL synchronization and SFN decoding with the primary serving cell 1200.

Further, in operation 1103, the UE 1100 performs DL synchronization and SFN decoding with the neighbor cell 1300.

In operation 1105, the UE 1100 calculates the SFN Offset between the neighbor cell 1300 for which the MIB has been decoded and the primary serving cell 1200. Further, the UE 1100 calculates the time difference between the sub-frame boundaries of the primary serving cell 1200 and the neighbor cell 1300 (hereinafter, referred to as an observed time difference (OTD)).

In operation 1107, the UE 1100 reports at least one of the calculated SFN Offset and the calculated OTD to an MeNB of the primary serving cell 1200 through a measurement report sent to the MeNB. At this time, the SFN Offset or the OTD may be reported along with the GCI/PCI of the reported cell.

As an alternative, as in operation 1109, at least one of the calculated SFN Offset and the calculated OTD may be reported through a UE Assistance Information message. In the example of FIG. 11, operation 1107 and operation 1109 may be selectively performed. An example of the UE Assistance Information message is shown in Table 1 below.

TABLE 1

UEAssistanceInformation message

```
-- ASN1START
UEAssistanceInformation-r11 ::=           SEQUENCE {
criticalExtensions              CHOICE {
c1                      CHOICE {
ueAssistanceInformation-r11
    UEAssistanceInformation-r11-IEs,
spare3 NULL, spare2 NULL, spare1 NULL
},
criticalExtensionsFuture          SEQUENCE { }
}
}
UEAssistanceInformation-r11-IEs ::=        SEQUENCE {
powerPrefIndication-r11              ENUMERATED {normal,
lowPowerConsumption}  OPTIONAL,
lateNonCriticalExtension     OCTET STRING
    OPTIONAL,
nonCriticalExtension              UEAssistanceInformation-
r12-IEs  OPTIONAL
}
UEAssistanceInformation-r12-IEs ::=        SEQUENCE {
SFNOffset           BIT STRING (SIZE (8))
    OPTIONAL,
SFNOffsetSign ENUMERATED {Positive, Negative} OPTIONAL,
subframeOffset           INTEGER (0..9)
    OPTIONAL,
reportedCellID              CellGlobalIdEUTRA
    OPTIONAL,
reportedPhyCellId PhysCellId OPTIONAL,
lateNonCriticalExtension     OCTET STRING
    OPTIONAL,
nonCriticalExtension          SEQUENCE { }
}
-- ASN1STOP
```

As in the above embodiment of the present disclosure, the UE may report the OTD between the frame boundaries of the primary serving cell and the neighbor cell measured in units of sub-frames (referred to as "sub-frame offset"), along with the SFN offset. It is to be noted that the sign for the sub-frame offset is required as described for the SFN offset.

In an embodiment of the present disclosure, the sign may not be reported for the sub-frame offset and instead the UE reports the sub-frame offset that is calculated between the current frame of the serving cell and the frame of the neighbor cell that starts within the current frame of the serving cell.

Figure 12:
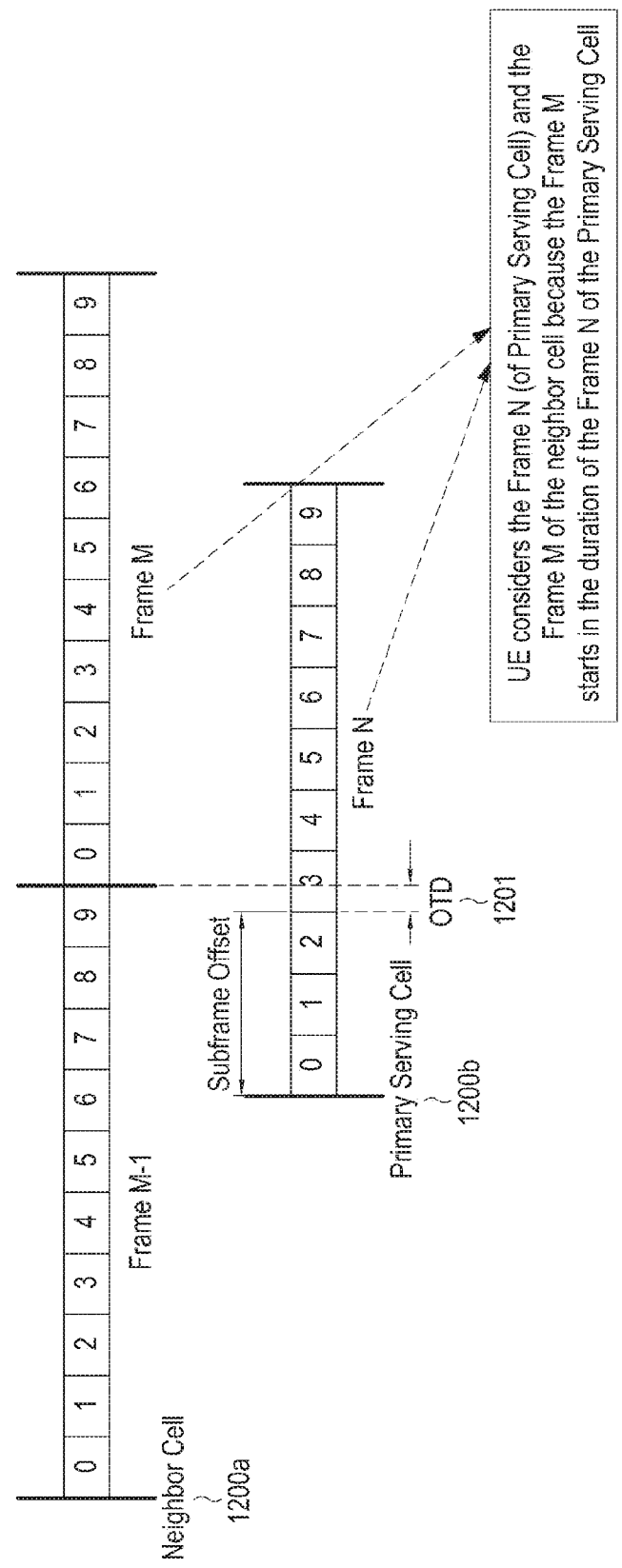
FIG. 12 is a view illustrating an example of calculating a sub-frame offset according to an embodiment of the present disclosure.

FIG. 12 is a view illustrating an example of calculating a sub-frame offset according to an embodiment of the present disclosure.

Referring to FIG. 12, various frames, such as frame M−1, Frame M and Frame N are illustrated, where a UE may calculate and report a Sub-frame Offset as a number of sub-frames between a start of a frame of a primary serving cell 1200*b* and a start of a frame of a neighbor cell 1200*a* which starts within the considered frame of the primary serving cell 1200*b*.

Further, referring to FIG. 12, an OTD 1201 between the sub-frame boundaries of the primary serving cell 1200*b* and the neighbor cell 1200*a* is also added along with the SFN Offset and the Sub-frame Offset. The UE calculates and reports the OTD 1201 between the start of the sub-frame of the primary serving cell 1200*b* and the start of the sub-frame of the neighbor cell 1200*a* that starts within the considered sub-frame of the primary serving cell 1200*b*.

In an embodiment of the present disclosure, an MeNB may derive the SFN offset between itself and a neighbor cell based on the SFN offsets reported by one or more UEs. The MeNB may perform linear averaging of the reported SFN offsets. The MeNB may signal the SFN offset to other UEs in order to avoid them form performing MIB decoding. The MeNB may perform averaging of the reported OTDs for a neighbor cell to calculate the estimated time difference between itself and the neighbor cell.

In the above embodiments of the present disclosure, it should be appreciated that the term MIB, wherever used, implies the SFN parameter contained in the MIB unless stated otherwise.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment (UE) in a wireless communication system, the method comprising:
identifying a first system frame number (SFN) of a neighbor cell in which a master information block (MIB) is decoded, the neighbor cell being a cell to be added as a second serving cell indicated by a first serving cell;
identifying a second SFN of the first serving cell, a frame of the first SFN starting during a frame of the second SFN; and
transmitting, to the first serving cell, a message including a number of subframes between the first SFN and the second SFN and a time difference between a subframe boundary of the neighbor cell and a subframe boundary of the first serving cell.

2. The method of claim 1, wherein the message further comprises at least one of a global cell identity or a physical cell identity.

3. The method of claim 1, wherein the SFN offset includes information indicating whether the first SFN is higher than the second SFN.

4. The method of claim 3,
wherein the information indicating whether the first SFN is higher than the second SFN includes a bit value,
wherein the bit value includes a first value when the first SFN is higher than the second SFN, and
wherein the bit value includes a second value when the first SFN is lower than the second SFN.

5. The method of claim 1, wherein the message is a UE assistance information message, and further comprising adding the neighbor cell as the second serving cell based on an indication of the first serving cell.

6. A method of a first serving cell of a user equipment (UE) in a wireless communication system, the method comprising:

receiving, from the UE, a message including a number of subframes between a first system frame number (SFN) and a second SFN and a time difference between a subframe boundary of a neighbor cell and a subframe boundary of the first serving cell, wherein the neighbor cell is a cell to be added as a second serving cell of the UE indicated by the first serving cell, wherein the first SFN is an SFN in which a master information block (MIB) of the neighbor cell is decoded by the UE, wherein the second SFN is an SFN of the first serving cell, and wherein a frame of the first SFN starts during a frame of the second SFN.

7. The method of claim 6, wherein the message further comprises at least one of a global cell identity or a physical cell identity.

8. The method of claim 6, wherein the SFN offset includes information indicating whether the neighbor cell has a higher SFN than the first serving cell.

9. The method of claim 8,
wherein the information indicating whether the first SFN is higher than the second SFN includes a bit value,
wherein the bit value includes a first value when the first SFN is higher than the second SFN, and
wherein the bit value includes a second value when the first SFN is lower than the second SFN.

10. The method of claim 6, wherein the message is a UE assistance information message, and further comprising indicating the UE to add the neighbor cell as the second serving cell.

11. A user equipment (UE) in a wireless communication system, the UE comprising:
a processor configured to:
identify a first system frame number (SFN) of a neighbor cell in which a master information block (MIB) is decoded, the neighbor cell being a cell to be added as a second serving cell indicated by a first serving cell, and
identify a second SFN of the first serving cell, a frame of the first SFN starting during a frame of the second SFN; and
a transmitter configured to transmit, to the first serving cell, a message including a number of subframes between the first SFN and the second SFN and a time difference between a subframe boundary of the neighbor cell and a subframe boundary of the first serving cell.

12. The UE of claim 11, wherein the message further comprises at least one of a global cell identity or a physical cell identity.

13. The UE of claim 11, wherein the SFN offset includes information indicating whether the first SFN is higher than the second SFN.

14. The UE of claim 13,
wherein the information indicating whether the first SFN is higher than the second SFN includes a bit value,
wherein the bit value includes a first value when the first SFN is higher than the second SFN, and
wherein the bit value includes a second value when the first SFN is lower than the second SFN.

15. The UE of claim 11, wherein the message is a UE assistance information message, and the processor is configured to add the neighbor cell as the second serving cell based on an indication of the first serving cell.

16. A first serving cell of a user equipment (UE) in a wireless communication system, the first serving cell comprising:
a receiver configured to receive, from the UE, a message including a number of subframes between a first system frame number (SFN) and a second SFN and a time difference between a subframe boundary of a neighbor cell and a subframe boundary of the first serving cell,
wherein the neighbor cell is a cell to be added as a second serving cell of the UE indicated by the first serving cell,
wherein the first SFN is an SFN in which a master information block (MIB) of the neighbor cell is decoded by the UE,
wherein the second SFN is an SFN of the first serving cell, and
wherein a frame of the first SFN starts during a frame of the second SFN.

17. The first serving cell of claim 16, wherein the message further comprises at least one of a global cell identity or a physical cell identity.

18. The first serving cell of claim 16, wherein the SFN offset includes information indicating whether the neighbor cell has a higher SFN than the first serving cell.

19. The first serving cell of claim 18,
wherein the information indicating whether the first SFN is higher than the second SFN includes a bit value,
wherein the bit value includes a first value when the first SFN is higher than the second SFN, and
wherein the bit value includes a second value when the first SFN is lower than the second SFN.

20. The first serving cell of claim 16, wherein the message is a UE assistance information message, and further comprising a transmitter configured to transmit, to the UE, a message indicating the UE to add the neighbor cell as the second serving cell.

* * * * *